United States Patent [19]

Juri et al.

[11] Patent Number: 5,440,706
[45] Date of Patent: Aug. 8, 1995

[54] DATA SHUFFLING APPARATUS POSSESSING REDUCED MEMORY

[75] Inventors: Tatsuro Juri, Osaka; Chiyoko Matsumi, Suita; Takao Kashiro, Moriguchi, all of Japan

[73] Assignee: Matsushita Electric Industrial Co., Ltd, Osaka, Japan

[21] Appl. No.: 733,211

[22] Filed: Jul. 19, 1991

[51] Int. Cl.6 ............... G06F 12/02; G06F 15/62; G09G 1/02
[52] U.S. Cl. .................... 395/412; 395/166; 345/120; 364/DIG. 1
[58] Field of Search ............... 395/165, 166, 164, 425; 364/134; 365/189.04; 340/799; 358/160, 403, 404, 444; 345/190, 189

[56] References Cited

U.S. PATENT DOCUMENTS

| | | | |
|---|---|---|---|
| 3,774,165 | 11/1973 | McCann, Jr. et al. | 340/172.5 |
| 4,470,142 | 9/1984 | Ive | 371/2 |
| 4,597,020 | 6/1986 | Wilkinson | 360/33.1 |
| 4,600,200 | 7/1986 | Oka et al. | 273/313 |
| 4,843,471 | 6/1989 | Yazawa et al. | 358/160 |
| 5,230,066 | 7/1993 | Morimi | 395/166 |

FOREIGN PATENT DOCUMENTS

| | | |
|---|---|---|
| 0060095A2 | 3/1982 | European Pat. Off. . |
| 0125840A1 | 5/1984 | European Pat. Off. . |
| 63-215278 | 9/1988 | Japan . |
| 63-215279 | 9/1988 | Japan . |
| 11142277 | 5/1989 | Japan . |
| 2-117289 | 5/1990 | Japan . |

*Primary Examiner*—Jack B. Harvey
*Assistant Examiner*—Michael A. Whitfield
*Attorney, Agent, or Firm*—Wenderoth, Lind & Ponack

[57] ABSTRACT

Each of a plurality of pages of video data are shuffled, each of the pages being composed of a plurality of blocks of data, using a data memory having a memory capacity of one page. The one page data memory temporarily stores data in a current page. A data address generator generates an address of the data memory so that the data in the current page are written into the data memory in a first sequence and the written data are read out from the data memory in a second sequence which is different from the first sequence to thereby shuffle the data in the current page. The data address generator generates the address such that data in a block in the current page is read from a portion of the data memory indicated by the address generated by the data address generator, and such that data in a block in a next page is written into the portion of the data memory indicated by the address generated by the data address generator.

22 Claims, 6 Drawing Sheets

DATA SHUFFLING APPARATUS POSSESSING REDUCED MEMORY

BACKGROUND OF THE INVENTION

1. Field of the Invention

The present invention relates to a data shuffling apparatus used in the recording or transmission of video information after high efficiency encoding.

2. Description of the Prior Art

The data quantity of video information is enormous, and accordingly, such information is often transmitted or recorded after effecting high efficiency encoding which reduces the data quantity. High efficiency encoding involves compressing the data quantity by removing redundant portions of the video information. As one method of high efficiency encoding, it is known, for example, to divide the input sample values into blocks composed of adjacent plural pixels, orthogonally transform the sample values in each block to obtain orthogonal transformation coefficients, and encode the orthogonal transformation coefficients. In such a block unit coding technique, it is first necessary to shuffle the input video data, or to rearrange the data into a sequence of blocks suited to encoding. In particular, shuffling of the blocks is important to enhance the coding efficiency or disperse the effects of error (see the Japanese Patent Application No. 63-271178).

Referring to FIG. 10, prior art example will now be described in which two fields (=1 frame) of TV signals are gathered to make up one page, and one block unit of data is composed of the signals from both fields. As shown in FIG. 10, such a block is composed of a total of 64 pixels, i.e., adjacent pixels from 4 horizontal lines by 8 vertical lines in each of two fields in a time axis direction. A conventional shuffling apparatus is shown in FIG. 11.

In FIG. 11, numeral 1 is a video input, 2 is an input switch, 3 is a first page memory, 4 is a second page memory, 5 is an output switch, 6 is a video output, and 7 is an address control unit. A TV signal is first entered beginning from the top line of the first field sequentially line after line, and after all lines of the first field are entered, the input of the second field is started. In FIG. 11, the video data entered from the video input 1 is input into the first page memory 3 by the input switch 2. At the same time, the video data of the previous page recorded in the second page memory 4 is shuffled, and delivered to the video output 6 through the output switch 5. Meanwhile, the input and output addresses of the two page memories 3, 4 are controlled by the address control unit 7, and are rearranged into blocks as shown in FIG. 10. In this way, when the input and output of the image data for one page is complete, the input switch 2 and output switch 5 are changed over, and the same processing is conducted using the first page memory as the output memory and the second page memory as the input memory. In this manner, by changing over the input and output memories, a continuously entered moving picture signal can be shuffled.

In this prior art apparatus, however, the shuffling of data in two fields (one page) requires video memories sufficient for four field (two pages). Thus, since the data quantity of video information is enormous, a large memory is required for shuffling, which results in an increase in both cost and power consumption.

SUMMARY OF THE INVENTION

It is hence a primary object of the invention to present a data shuffling apparatus which is capable of shuffling one page of data using a memory having a data capacity of about one page.

To achieve the above object, the invention presents a data shuffling apparatus for shuffling data in each of a plurality of pages of data, each of the plurality of pages being composed of a plurality of blocks of data. The apparatus includes a data memory for temporarily storing data in a current page, and data address generator coupled to the memory for generating an address of the data memory so that the data in the current page are written into the data memory in a first sequence and the written data are read out from the data memory in a second sequence which is different from the first sequence to thereby shuffle the data in the current page.

The data address generator generates the address such that data in a block in the current page is read from a portion of the data memory indicated by the address generated by the data address generator, and such that data in a block in a next page is written into the portion of the data memory indicated by the address generated by the data address generator.

DESCRIPTION OF THE PREFERRED EMBODIMENTS

Figure 1:
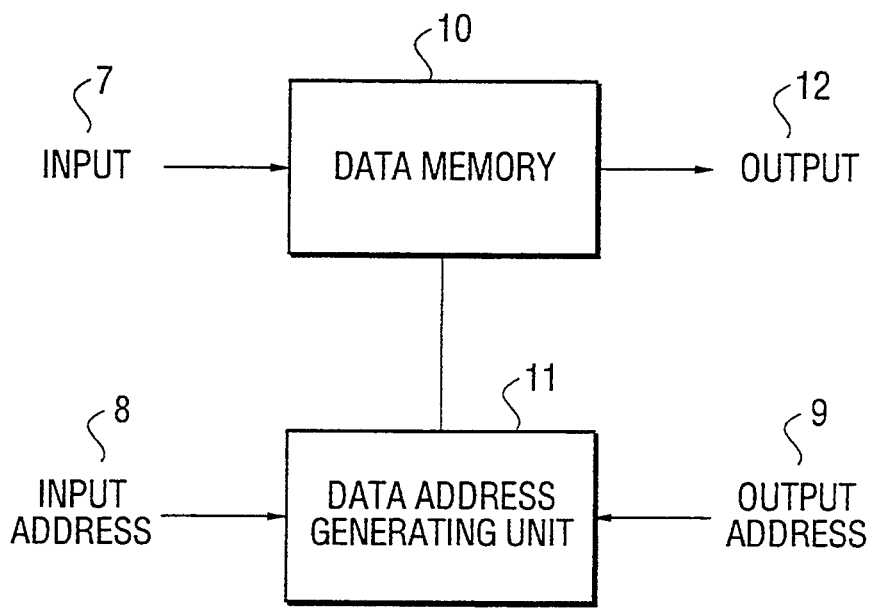
FIG. 1 is a block diagram of a first embodiment of the invention.

Referring now to the drawings, preferred embodiments of the invention are described below. FIG. 1 is a block diagram of a first embodiment of the invention. In FIG. 1, numeral 7 is a data input, 8 is an input address, 9 is an output address, 10 is a data memory, 11 is a data addressing generating unit, and 12 is a data output. This embodiment presents a data shuffling apparatus for shuffling video signals in which one page is composed of two fields. The input and output addresses obtained from the input address 8 and output address 9 are fed into the data address generating unit 11, and are converted into an address suitable for the data memory 10.

The data stored in the area indicated by the address delivered from the data address generating unit 11 is delivered to the output 12. At almost the same time, or immediately thereafter, the data in each block entered from the input 7 is written into the same area indicated by the address delivered from the data address generating unit 11.

Figure 2:
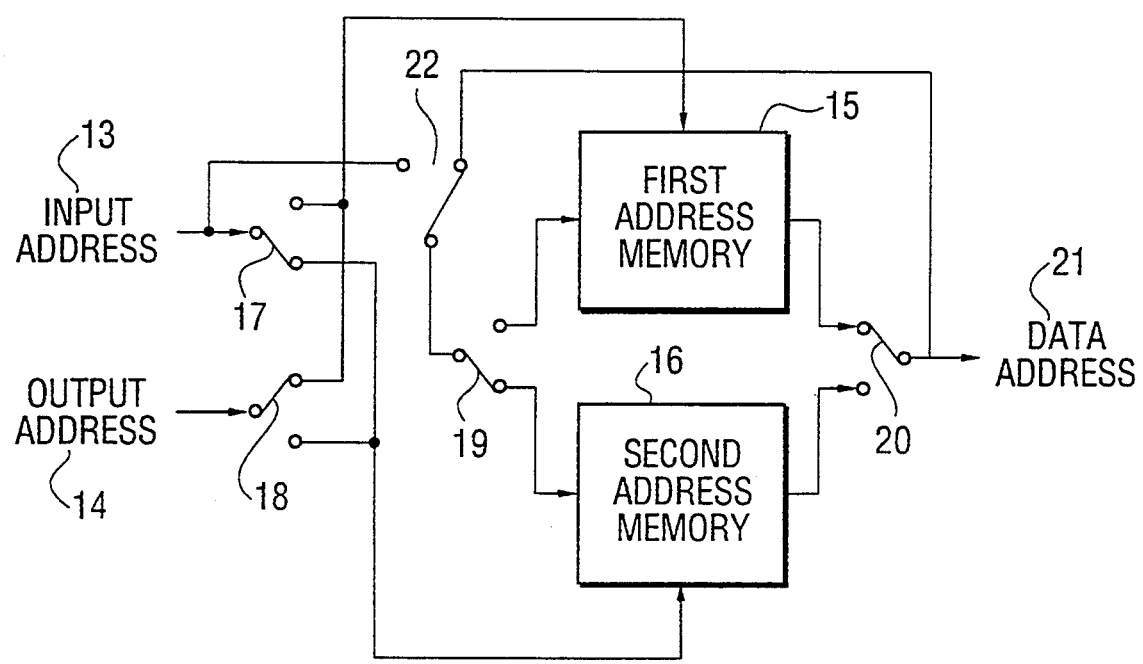
FIG. 2 is an execution diagram for a data address generating unit of the first embodiment of the invention when generating addresses for input of page n to a data memory.

FIG. 2 is an execution diagram of the data address generating unit 11 in FIG. 1. In FIG. 2, numeral 13 is an input address (which is the same as numeral 8 in FIG. 1), 14 is an output address (which is the same as numeral 9 in FIG. 1), 15 is a first address memory, 16 is a second address memory, 17 to 20 and 22 are switches, and 21 is a data address output.

Figure 3:
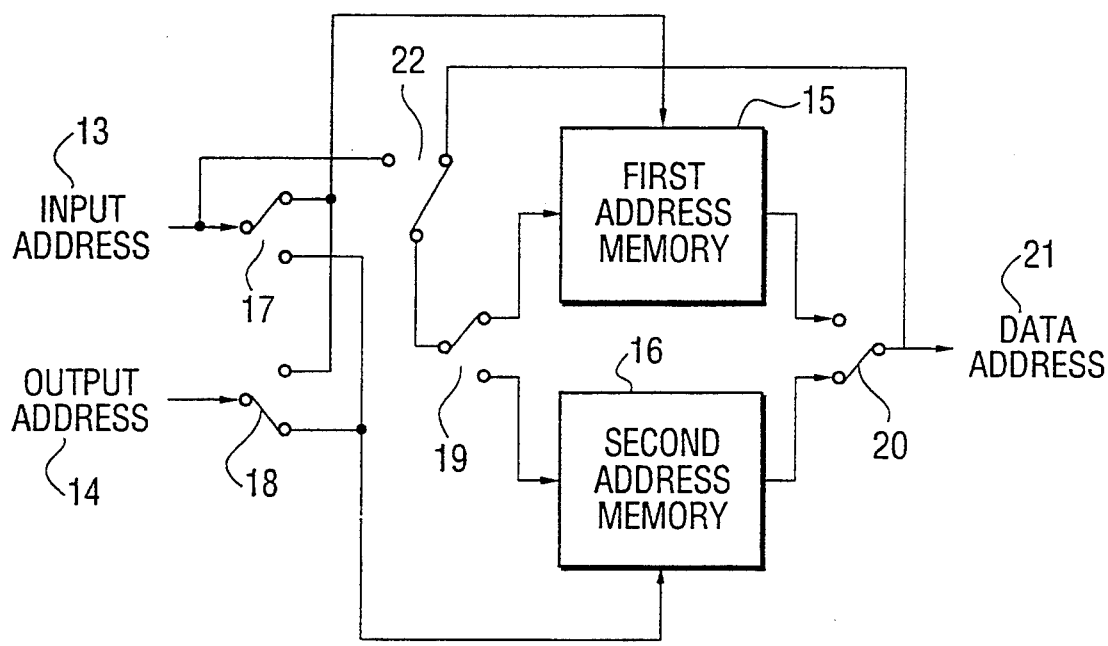
FIG. 3 is an execution diagram of the data address generating unit of FIG. 2 when generating addresses for input of page n+1 to a data memory.

Assume that first the address corresponding to the data memory at the time of the input of the data of page n−1 into the data memory is written in the first address memory 15. The input address 13 is connected to the address of the second address memory 16 by the switch 17, the output address 14 to the address of the first address memory 15 by the switch 18, and the data address output 21 to the output of the first address memory 15 and to the input of the second address memory 16 by the switches 19, 20 and 22. The data address thus written in the first address memory 15 is read out according to the output address entered from the output address 14, and is delivered to the address output 21 as the address corresponding to the data memory for entering page n. The address delivered from the address output 21 becomes the input address corresponding to the data of page n, and simultaneously becomes the output address of the data of page n−1. At the same time, the address of the data memory corresponding to the input of page n is recorded in the second address memory 16 according to the input address entered from the input address 13. In this way, all addresses of the data memory corresponding to page n are delivered, and then the switches are inverted, and the addresses corresponding to page n+1 are similarly delivered from the second address memory 16. FIG. 3 shows a connection example of the switches 17 to 20 corresponding to page n+1. In the data address generating unit of the invention, by repeating such operation in every frame, the input and output addresses of the data memory corresponding to each page can be generated. Incidentally, the switch 22 in FIG. 2 and FIG. 3 is used when the input address 13 is employed as the initial value of the content of the address memory, at the time of reset such as when turning on the power.

By utilizing the invention in the manner described above, the data addresses of the output data and input data may be equalized, so that the size of the data memory can be reduced to ½ that of the conventional memory.

A second embodiment will now be explained in which a part of the input data is not utilized. Generally, video information contains horizontal blanking and vertical blanking in every field, and such portions are not usually transmitted in high efficiency encoding. Therefore, the capacity of the memory may be reduced by not storing such redundant portions in the data memory. In the first embodiment, however, since the data input timing and output timing are identical, it is necessary to synchronize the timing of the redundant portion of the input side and the timing of the redundant portion of the output side.

Figure 4:
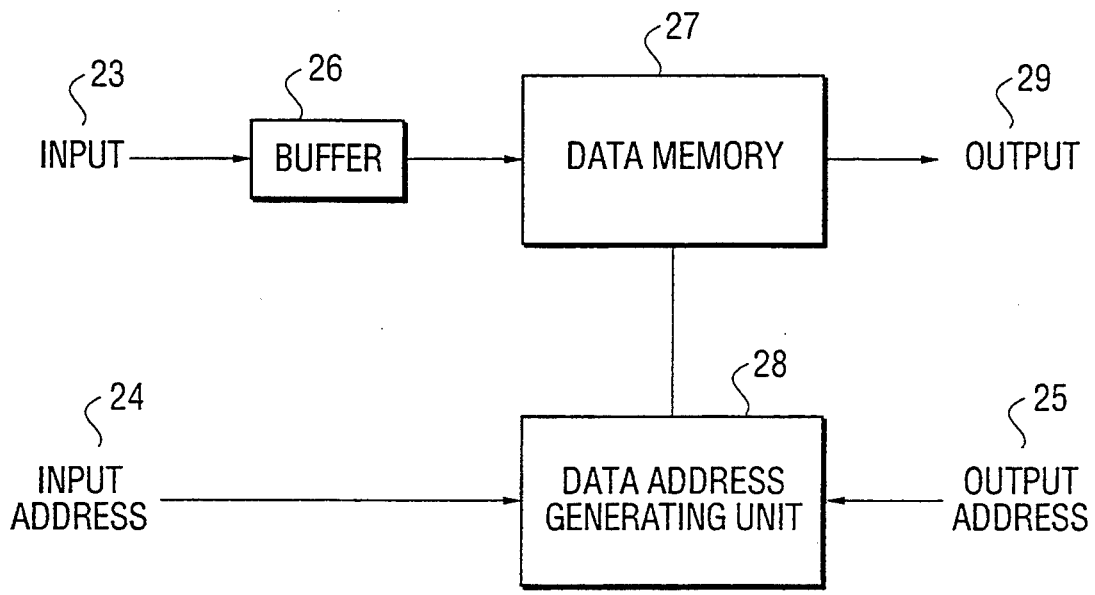
FIG. 4 is a block diagram of a second embodiment of the invention.

FIG. 4 is a block diagram of the second embodiment for matching the timings of redundant parts of input and output. In FIG. 4, numeral 23 is an input, 24 is an input address, 25 is an output address, 26 is a buffer, 27 is a data memory, 28 is a data address generating unit, and 29 is an output. The difference between the second embodiment and the first embodiment of FIG. 1 is that in the second embodiment the buffer 26 is placed between the input unit 23 and the data memory 27. The data entered from the input unit 23 is first stored in the buffer 26, and is fed into the data memory 27 by matching the timing of the data delivered to the output 29. Thus, by matching the input and output timings using the buffer 26, the invention is applicable even when the input and output having different timings.

It is noted that FIG. 4 depicts the buffer 26 being disposed at the input side of the data memory 27, but it is also possible to instead place the buffer 26 at the output side of the data memory 27.

Figure 5:
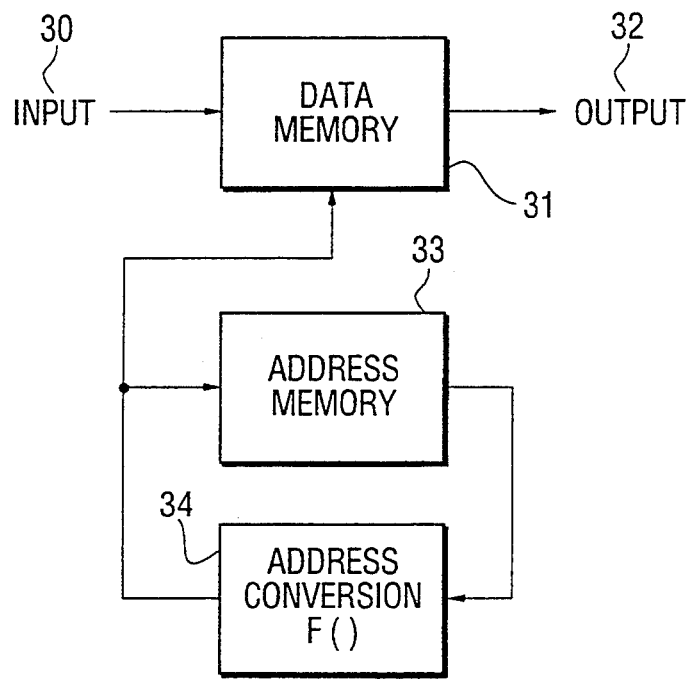
FIG. 5 is a block diagram of a third embodiment of the invention.

A third embodiment of the invention will now be explained with reference to the block diagram in FIG. 5. In FIG. 5, numeral 30 is a data input, 31 is a data memory for one page portion, 32 is a data output, 33 is an address memory, and 34 is an address converting unit. The video data of page n−1 stored in the data memory 31 is delivered from the data output unit 32 as the data stored in the area indicated by the address generated by the address converting unit 34. After the output of the data at this address, the video data of page n entered from the data input unit 30 is stored in the same area indicated by the same address. At the same time, the input and output addresses of the data memory 31 delivered from the address converting unit 34 are stored in the address memory 33.

Figure 10:
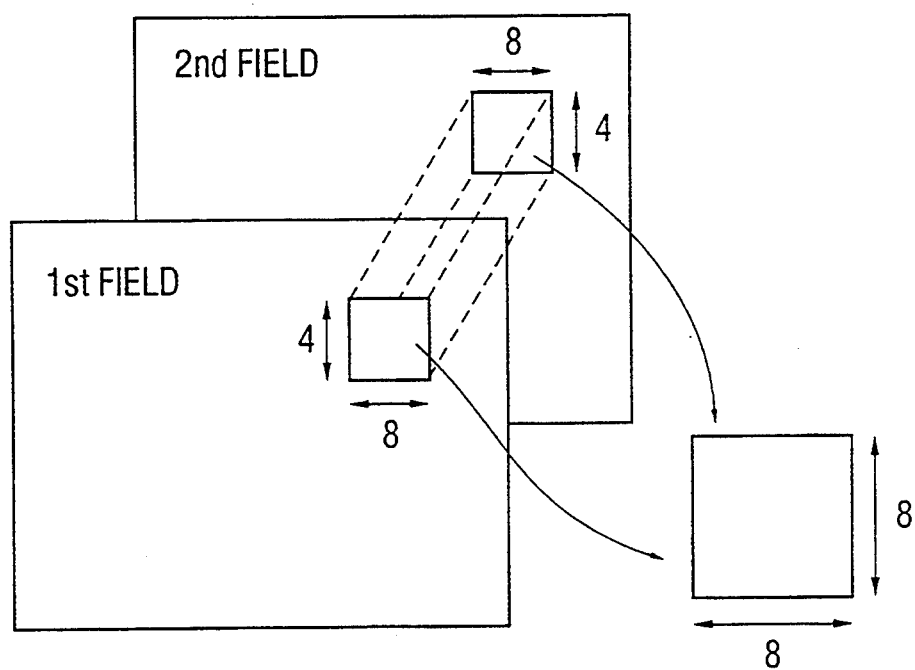
FIG. 10 is an explanatory diagram of block forming in the prior art.

The operation of the apparatus in FIG. 5 is described below. To simply the explanation, it is assumed that the video data entering the shuffling apparatus is composed of 8 horizontal pixels and 4 vertical pixels in each one field, and is rearranged into a block of 64 pixels by gathering together the video data of two fields as shown in FIG. 10. Therefore, the line numbers of the input video data and the line numbers of the output video data are expressed in the sequence as shown in Table 1 below. The input line numbers 0 to 3 in Table 1 denote the first field, and 4 to 7 the second field. When the input and output sequences are controlled in the sequence shown in Table 1, a block of 64 pixels composed of two fields is made up. More specifically, when the input address of a certain page corresponding to the data memory is equal to the input line number of Table 1, the output address of that page may be generated by matching with the sequence of the output line numbers in Table 1. In Table 1, supposing the i-th input address of a certain page is $A_i$, the output address $B_i$ to be delivered by the i-th time of that page is expressed as the following function f( ):

$$B_i = f(A_i) = 4 \times A_i - p \times 7$$

where p is a maximum integer as long as $B_i$ is not a negative number.

TABLE 1

| Input, output sequence | Input line number | Output line number |
|---|---|---|
| 0 | 0 | 0 |
| 1 | 1 | 4 |
| 2 | 2 | 1 |
| 3 | 3 | 5 |
| 4 | 4 | 2 |
| 5 | 5 | 6 |
| 6 | 6 | 3 |

TABLE 1-continued

| Input, output sequence | Input line number | Output line number |
| --- | --- | --- |
| 7 | 7 | 7 |

Figure 11:
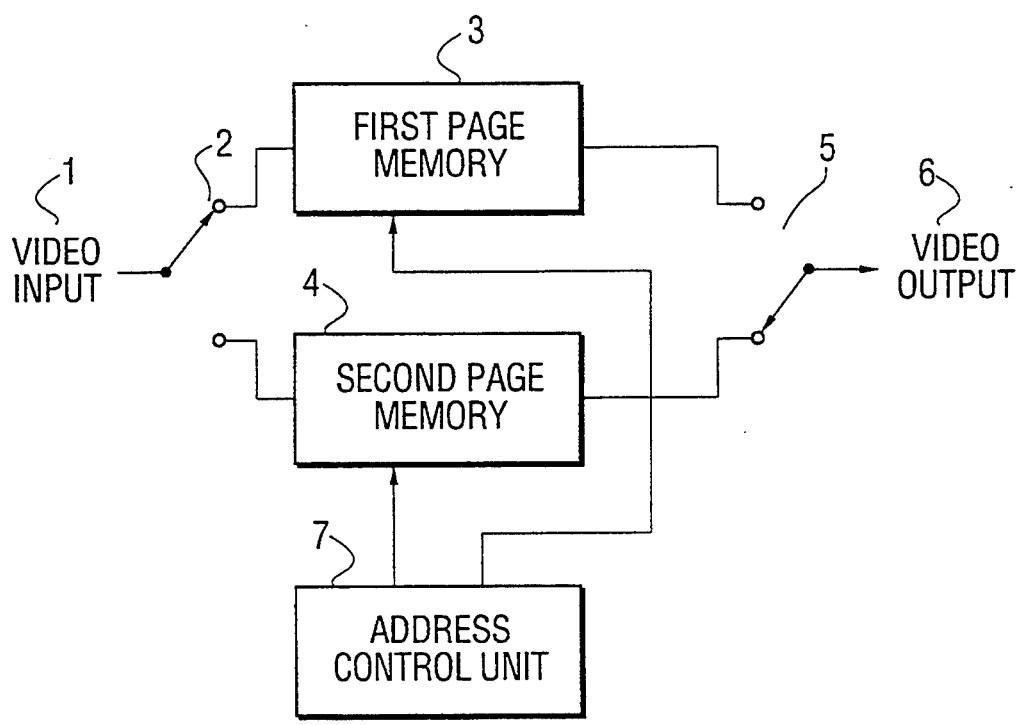
FIG. 11 is a block diagram of a shuffling apparatus of the prior art.

The address converting unit 34 in FIG. 5 generates, by using this function f(), the output address of page n−1 (that is, the input address of page n) from the input address of page n−1. In this embodiment, therefore, the output address of page n−1 of the data memory and the input address of page n are equal to each other. This input, output address is delayed for the portion of one page, and the input, output address of the next page is output in the address converting unit 34. As a result, the input, output address for each page may be easily generated. Further, in this embodiment a one page memory is sufficient, and thus the video memory capacity may be reduced to ½ that of the prior art shown in FIG. 11. Incidentally, the number of lines and number of pixels used in the explanation of this embodiment may be freely varied, and address control on a basis other than a line by line basis is also possible. At the same time, the above described function may be variously applied, and the address converting unit may be realized, for example, using a ROM table or the like.

Figure 6:
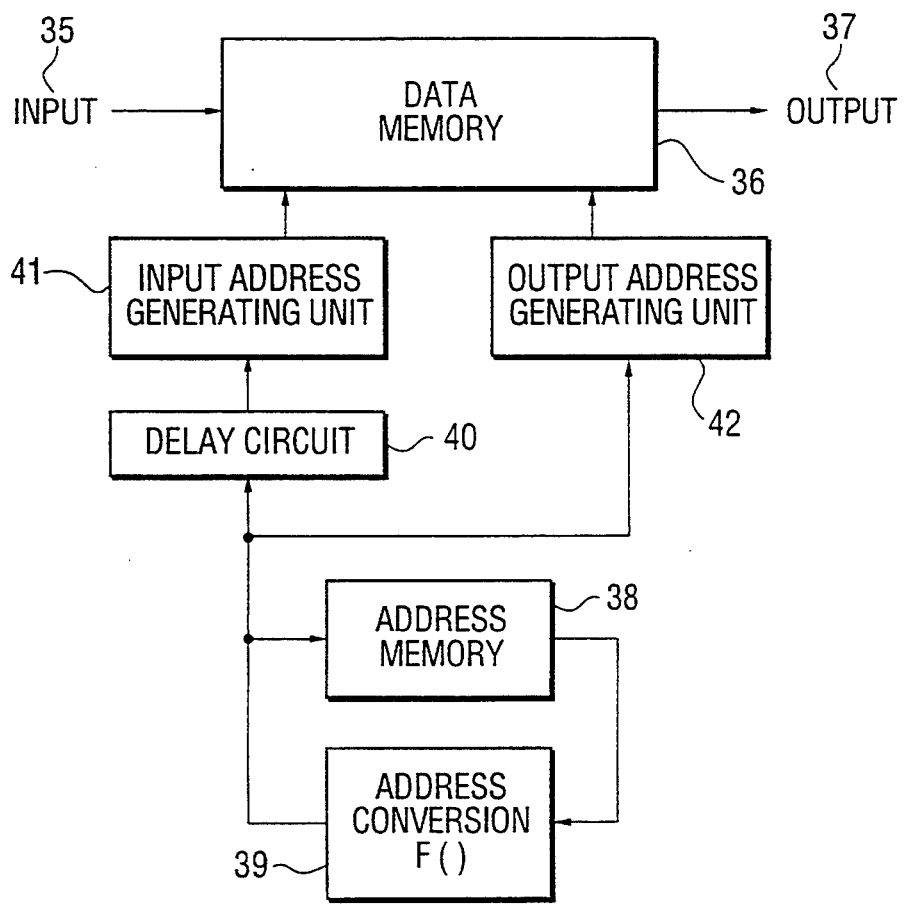
FIG. 6 is a block diagram of a fourth embodiment of the invention.

A fourth embodiment of the invention is shown in FIG. 6. In FIG. 6, numeral 35 is a data input, 36 is a data memory for one page, 37 is a data output, 38 is an address memory, 39 is an address converting unit, 40 is a delay circuit for delaying the address for a specific time, 41 is an input address generating unit, and 42 is an output address generating unit. The video data entered from the data input unit 35 is stored in the data memory 36 according to the input address generated by the input address generating unit 41. The output of the data memory 36 is delivered to the data output 37 according to the output address generated by the output address generating unit 42.

Figure 7:
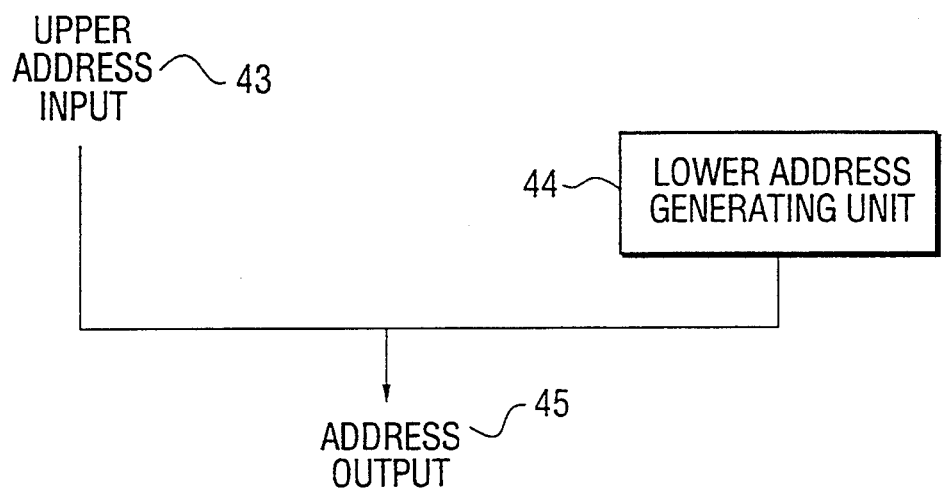
FIG. 7 is a diagram illustrating the constitution of an input address generating unit of the fourth embodiment.

FIG. 7 shows the constitution of the input address generating unit 41 and output address generating unit 42. The output of the address converting unit 39 is an upper bit part of the address of the data memory 36 (hereafter referred to as an "upper address"). In FIG. 7, numeral 43 denotes an upper address input for receiving the output of the delay circuit 40 or address converting unit 39 in FIG. 6, 44 is a lower address generating unit for generating a lower bit part of the address of the data memory 36 (hereafter referred to as a "lower address"), and 45 is an address output. The upper address entered from the input 43 is delivered from the output 45 together with the lower address generated in the lower address generating unit 44. The upper address in this embodiment represents the address for each block, while the lower address is the address for rearranging the data in each block. Accordingly, when the address for each block (upper address) differs, the lower addresses in the input address generating unit 41 and output address generating unit 42 in FIG. 6 may be generated quite independently. The upper address of the input and output address is generated by using the address memory 38 and address converting unit 39 as in the embodiment of FIG. 5. The upper address of the input address of page n−1 delivered from the address memory 38 is converted into the upper address of the input address corresponding to page n (that is, the upper address of the output address corresponding to page n−1) in the address converting unit 39. The upper address obtained here is entered into the delay circuit 40 and output address generating unit 42. The upper address entered in the delay circuit 40 is delayed for a specific time, and is entered into the input address generating unit 41. Due to this time delay, different addresses are entered in the upper address to be entered in the input address generating unit 41 and the upper address entered into the output address generating unit 42, and the upper address entered in the output address generating unit 42 is always ahead. Therefore, the input address delivered from the input address generating unit 41 is always different from the output address delivered from the output address generating unit 42. In this embodiment, thus, the data in each page can be shuffled using a data memory for one page only. Further, this embodiment is different from the embodiment shown in FIG. 5 since the input and output addresses can be generated independently, and thus a more versatile manner of effecting rearrangement is possible. For example, the lower address of the input address can generate addresses in each line by matching with the data input, while the lower address of the output address can generate addresses in each 8 horizontal pixels, and 4 vertical pixels by matching with the data output. Furthermore, in this embodiment, since only the upper portion of the input and output address is generated using the address memory 38, the capacity of the address memory 38 may be reduced. Moreover, in this embodiment, the timing of the data output is ahead of the timing of the data input for the delay time of the delay circuit 40. In an actual TV signal, however, a specific blanking period is present at the end of each page. Accordingly, by advancing the data output by making use of this blanking period, it is possible to start the output after the input of the previous page is complete.

Figure 8:
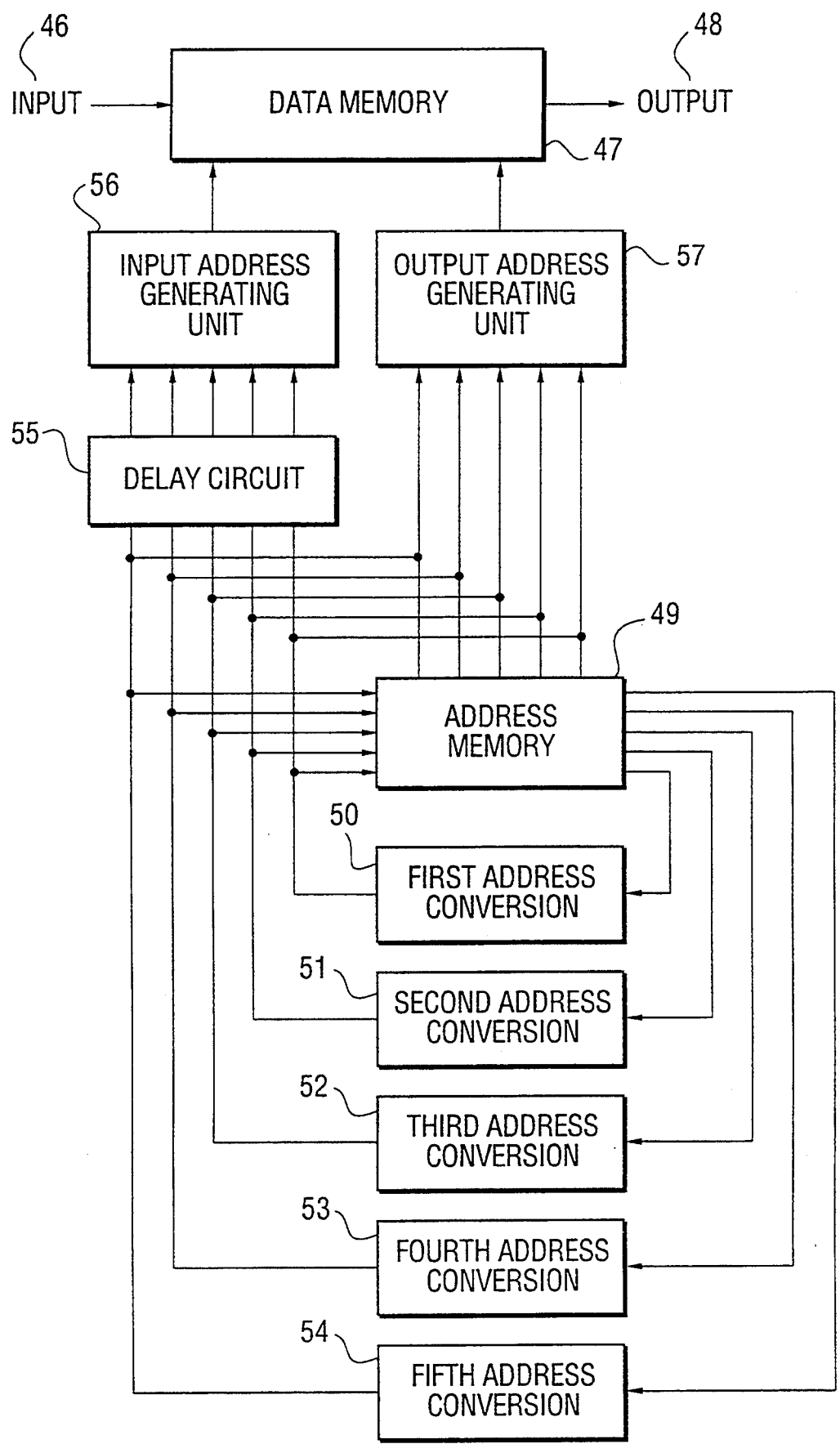
FIG. 8 is a block diagram of a fifth embodiment of the invention.
Figure 9:
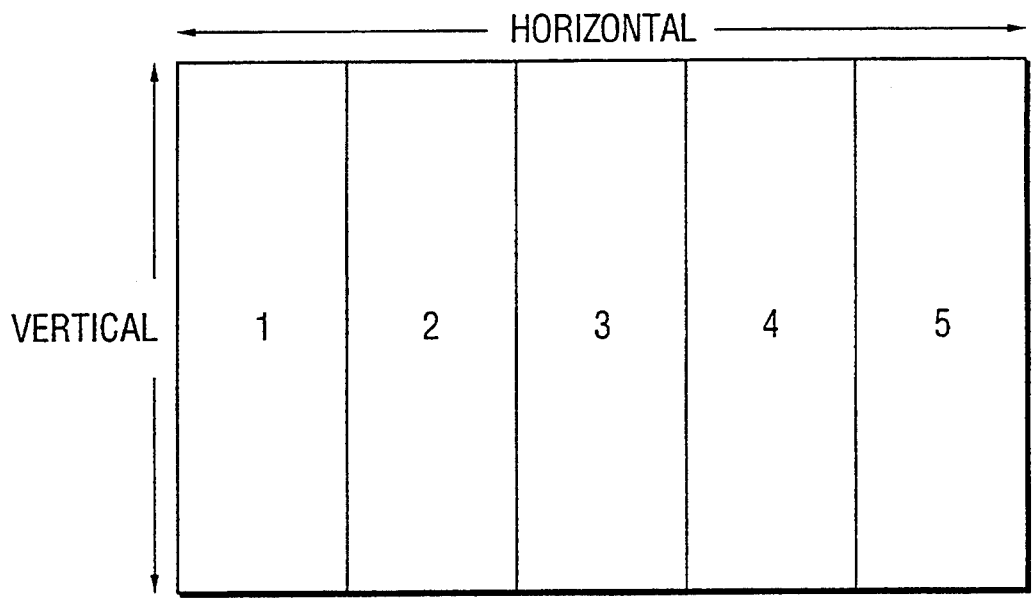
FIG. 9 is an explanatory diagram of division of one page of video information according to the fifth embodiment of the invention.

Referring now to FIG. 8 a fifth embodiment of the invention will now be explained. In FIG. 8, numeral 46 is a data input, 47 is a data memory for one page, 48 is a data output, 49 is an address memory, 50 is a first address converting unit, 51 is a second address converting unit, 52 is a third address converting unit, 53 is a fourth address converting unit, 54 is a fifth address converting unit, 55 is a delay circuit for delaying an address for a specific time, 56 is an input address generating unit, and 57 is an output address generating unit. The video data entered from the data input unit 46 is stored in the data memory according to the input address generated by the input address generating unit 56. The output of the data memory 47 is delivered to the data output 48 according to the output address generated by the output address generating unit 57. Of these input and output addresses, the lower addresses are generated inside the input address generating unit 56 and output address generating unit 57 as shown in FIG. 7. By contrast, the upper addresses of the input and output addresses are generated, as in the embodiment of FIG. 6, in a total of five (k=5) address converting units of the first address converting unit 50 to the fifth address converting unit 54, as well as in the address memory 49. In this embodiment, the video information of one page is divided horizontally into five parts as shown in FIG. 9, and is rearranged into blocks differently in each part. Therefore, the upper address of the input address of the previous page delivered from the address memory 49 is first classified into five groups, and depending on which region in FIG. 9, each group belongs to, address conversion is selected from among the first address converting unit 50 to the fifth address converting unit 54. The upper address converted by the selected address conversion is entered into the delay circuit 55 and output address generating unit 57. The upper address entered into the delay circuit 55 is delayed for a specific time, and is fed into the input address generating unit 56. As a result, the input address delivered from the input address generating unit 56 is always different from the output address delivered from the output address generating unit 57, and, moreover, it is possible to generate an input address indicating an area from which data have been read out just therebefore by the output address. In contrast to the embodiment of FIG. 6, the embodiment in FIG. 8 has a higher degree of freedom in shuffling the data. In this embodiment, as shown in FIG. 9, since one page is divided into five parts and reassembled, the efficiency of the high efficiency encoding and the dispersement of the effects of transmission route error are improved.

It is noted that the particularly described method of dividing one page and the number of division (k) are arbitrary.

The invention has been described herein by referring to five embodiments, but the constitution of the invention may also be realized in other various manners. In the fourth and fifth embodiments, the input and output addresses to the data memory are independent. By making use of this property, in an input signal having jitter such as in a household VTR or the like, the input clock of the data memory can be synchronized with the input signal, and the output clock may be synchronized with the subsequent signal processing clock, so that the input jitter can be removed. Also, by controlling the data address generating unit of the invention, it is also possible to realize special reproduction modes such as still picture, slow and strobe reproduction.

Incidentally, in the foregoing embodiments of the invention, the encoding process is explained, but the invention may be similarly applied to decoding. Also, one page is assumed to be composed of two fields, but one page may be composed in units of various data quantities, and the invention may be also applied to shuffling of data other than video signal data.

In the thus constituted invention, the addresses to the input video data are assigned to the addresses of the already delivered video data. Accordingly, shuffling of one page can be realized using the data memory of one page, whereby a moving picture may be shuffled using a memory capacity which is ½ that needed in the prior art. Further, the input and output addresses of each page may be easily generated by using the addresses of the previous page recorded in the address memory. As a result, using a relatively simple control, the circuit scale and power consumption may be substantially reduced. Furthermore, as mentioned above, the invention may be also applied in the removal of jitter from the input signal.

What is claimed is:

1. A data shuffling apparatus for shuffling data in each of a plurality of pages of data, each of the plurality of pages being composed of a plurality of blocks of data, said apparatus comprising:
   a data memory for temporarily storing data in a current page; and
   data address generating means coupled to the memory for generating an address of the data memory so that the data in the current page are written into the data memory in a first sequence and the written data are read out from the data memory in a second sequence which is different from the first sequence to thereby shuffle the data in the current page,
   wherein the data address generating means generates the address such that data in a block in the current page is read from a portion of the data memory indicated by the address generated by the address generating means, and such that data in a block in a next page is written into the portion of the data memory indicated by the address generated by the data address generating means.

2. An apparatus of claim 1, wherein the data address generating means includes an address memory for recording therein the address, and wherein the address corresponding to the current page is recorded in the address memory, and the address corresponding to the next page is controlled according to the address recorded in the address memory.

3. An apparatus of claim 1, wherein each page of the plurality of pages being inputted to the apparatus is preceded by a blanking period, and wherein the data in the current page written in the data memory is read out during the blanking period of the next page.

4. An apparatus of claim 1, wherein the data to be shuffled are data of a video signal, and wherein a timing for inputting the data into the apparatus is synchronized with a clock which is synchronized with a horizontal synchronizing signal of the video signal, and a timing for reading out the written data from the data memory is synchronized with a clock signal of a data processor coupled to the apparatus.

5. A data shuffling apparatus for shuffling data in each of a plurality of pages of data, each of the plurality of pages being composed of a plurality of blocks of data, said apparatus comprising:
   a data memory for temporarily storing data in a current page;
   buffer means for matching timings of data inputted to the data memory and data outputted from the data memory; and
   data address generating means coupled to the memory for generating an address of the data memory so that the data in the current page are written into the data memory in a first sequence and the written data are read out from the data memory in a second sequence which is different from the first sequence to thereby shuffle the data in the current page,
   wherein the data address generating means generates the address such that data in a block in the current page is read from an area of the data memory indicated by the address generated by the address generating means, and such that data in a block in a next page is written into the area of the data memory indicated by the address generated by the data address generating means.

6. An apparatus of claim 5, wherein each page of the plurality of pages being inputted to the apparatus is preceded by a blanking period, and wherein the data in the current page written in the data memory is read out during the blanking period of the next page.

7. An apparatus of claim 5, wherein the data to be shuffled are data of a video signal, and wherein a timing for inputting the data into the apparatus is synchronized with a clock which is synchronized with a horizontal synchronizing signal of the video signal, and a timing for reading out the written data from the data memory is synchronized with a clock signal of a data processor coupled to the apparatus.

8. A data shuffling apparatus for shuffling data in each of a plurality of pages of data, each of the plurality of pages being composed of a plurality of blocks of data, said apparatus comprising:

a data memory for temporarily storing data in a current page; and data address generating means coupled to the memory for generating an address of the data memory so that the data in the current page are written into the data memory in a first sequence and the written data are read out from the data memory in a second sequence which is different from the first sequence to thereby shuffle the data in the current page, wherein the data address generating means generates the address such that data in a block in the current page is read from a portion of the data memory indicated by the address generated by the address generating means, and such that data in a block in a next page is written into the portion of the data memory indicated by the address generated by the data address generating means;

wherein the data address generating means comprises:

an address memory for recording therein addresses of the data memory such that an address Bi indicating an area of the data memory from which a block of data written therein has been read out is recorded into an address i of the address memory, the address Bi recorded in the address i of the address memory being applied to the data memory for writing an i-th input block of data in the current page into the area of the data memory indicated by the address Bi; and address converting means coupled to the address memory for converting the address Bi outputted from the address memory to an address Ai which is expressed by Ai=f(Bi), wherein f( ) denotes a predetermined conversion function of Bi, the address Ai being applied to the data memory for reading out a block of data written into an area of the data memory indicated by the address Ai as an i-th output block of data in the current page.

9. An apparatus of claim 8, wherein each page of the plurality of pages being inputted to the apparatus is preceded by a blanking period, and wherein the data in the current page written in the data memory is read out during the blanking period of the next page.

10. An apparatus of claim 8, wherein the data to be shuffled are data of a video signal, and wherein a timing for outputting the data into the apparatus is synchronized with a clock which is synchronized with a horizontal synchronizing signal of the video signal, and a timing for reading out the written data from the data memory is synchronized with a clock signal of a data processor coupled to the apparatus.

11. A data shuffling apparatus for shuffling data in each of a plurality of pages of data, each of the plurality of pages being composed of a plurality of blocks of data, said apparatus comprising:

a data memory for temporarily storing the plurality of blocks of data in a current page; and data address generating means coupled to the memory for generating an address of the data memory so that the data in the current page are written into the data memory in a first sequence and the written data are read out from the data memory in a second sequence which is different from the first sequence to thereby shuffle the data in the current page, the address being composed of an upper position address indicating an area for one block of data and a lower position address indicating a portion for each data in the block within the area, wherein the data address generating means generates the address such that data in a block in the current page is read from a portion of the data memory indicated by the address generated by the address generating means, and such that data in a block in a next page is written into the portion of the data memory indicated by the address generated by the data address generating means;

wherein the data address generating means comprises:

lower position address generating means for generating the lower position address;

an address memory for recording therein upper position addresses of the data memory such that an address Bi indicating an area of the data memory from which a block of data written therein has been read out is recorded into an address i of the address memory, the address Bi recorded in the address i of the address memory being applied together with the lower position address generated by the lower position address generating means to the data memory for writing an i-th input block of data in the current page into the area of the data memory indicated by the address Bi; and address converting means coupled to the address memory for converting the address Bi outputted from the address memory to an address Ai which is expressed by Ai=f(Bi), wherein f( ) denotes a predetermined conversion function of Bi, the address Ai being applied together with the lower position address generated by the lower position address generating means to the data memory for reading out a block of data written into a portion of the data memory indicated by the address Ai as an i-th output block of data in the current page.

12. An apparatus of claim 11, wherein each page of the plurality of pages being inputted to the apparatus is preceded by a blanking period, and wherein the data in the current page written in the data memory is read out during the blanking period of the next page.

13. An apparatus of claim 11, wherein the data to be shuffled are data of a video signal, and wherein a timing for inputting the data into the apparatus is synchronized with a clock which is synchronized with a horizontal synchronizing signal of the video signal, and a timing for reading out the written data from the data memory is synchronized with a clock signal of a data processor coupled to the apparatus.

14. A data shuffling apparatus for shuffling data in each of a plurality of pages of data, each of the plurality of pages being composed of a plurality of blocks of data, said apparatus comprising:

a data memory for temporarily storing data in a current page, the plurality of blocks in the current page being classified into a plurality of groups of blocks; and data address generating means coupled to the memory for generating an address of the data memory so that the data in each of the plurality of groups of blocks in the current page are written into the data memory in a first sequence and the written data are read out from the data memory in a second sequence which is different from the first sequence to thereby shuffle the data in each of the plurality of groups of blocks in the current page, wherein the data address generating means generates the address such that data in a block in the current page is read from a portion of the data memory indicated by the address generated by the address generating means, and such that data in a block in a next page is written into the portion of the data memory indicated by the address generated by the data address generating means;

wherein the data address generating means comprises:

an address memory for recording therein addresses of the data memory such that an address Bi indicating an area of the data memory from which a block of data written therein has been read out is recorded into an address i of the address memory, the address Bi recorded in the address i of the address memory being applied to the data memory for writing an i-th input block of data in the current page into the area of the data memory indicated by the address Bi; and a plurality of address converting means each being coupled to the address memory for converting the address Bi outputted from the address memory, wherein, when the i-th input block of data in the current page belongs to a j-th group of blocks among the plurality of groups of blocks of data, a j-th address converting means converts the address Bi outputted from the address memory to an address Ai which is expressed by $Ai=fj(Bi)$, where $fj(\ )$ denotes a predetermined conversion function of Bi which is dependent on the j-th group of blocks, the address Ai being applied to the data memory for reading out a block of data written into an area of the data memory indicated by the address Ai as an i-th output block of data in the current page.

15. An apparatus of claim 14, wherein each page of the plurality of pages being inputted to the apparatus is preceded by a blanking period, and wherein the data in the current page written in the data memory is read out during the blanking period of the next page.

16. An apparatus of claim 14, wherein the data to be shuffled are data of a video signal, and wherein a timing for inputting the data into the apparatus is synchronized with a clock which is synchronized with a horizontal synchronizing signal of the video signal, and a timing for reading out the written data from the data memory is synchronized with a clock signal of a data processor coupled to the apparatus.

17. A data shuffling apparatus for shuffling data in each of a plurality of pages of data, each of the plurality of pages being composed of a plurality of blocks of data, said apparatus comprising:

a data memory for temporarily storing the plurality of blocks of data in a current page, the plurality of blocks in the current page being classified into a plurality of groups of blocks; and data address generating means coupled to the memory for generating an address of the data memory so that the data in the current page are written into the data memory in a first sequence and the written data are read out from the data memory in a second sequence which is different from the first sequence to thereby shuffle the data in the current page, the address being composed of an upper position address indicating an area for one block of data and a lower position address indicating a portion for each data in the block within the area, wherein the data address generating means generates the address such that data in a block in the current page is read from a portion of the data memory indicated by the address generated by the address generating means, and such that data in a block in a next page is written into the portion of the data memory indicated by the address generated by the data address generating means;

wherein the data address generating means comprises:

lower position address generating means for generating the lower position address;

an address memory for recording therein upper position addresses of the data memory such that an address Bi indicating an area of the data memory from which a block of data written therein has been read out is recorded into an address i of the address memory, the address Bi recorded in the address i of the address memory being applied together with the lower position address generated by the lower position address generating means to the data memory for writing an i-th input block of data in the current page into the area of the data memory indicated by the address Bi; and a plurality of address converting means each being coupled to the address memory for converting the address Bi outputted from the address memory, wherein, when the i-th input block of data in the current page belongs to a j-th group of blocks among the plurality of groups of blocks of data, a j-th address converting means converts the address Bi outputted from the address memory to an address Ai which is expressed by $Ai=fj(Bi)$, where $fj(\ )$ denotes a predetermined conversion function of Bi which is dependent on the j-th group of blocks, the address Ai being applied to the data memory for reading out a block of data written into an area of the data memory indicated by the address Ai as an i-th output block of data in the current page.

18. An apparatus of claim 17, wherein each page of the plurality of pages being inputted to the apparatus is preceded by a blanking period, and wherein the data in the current page written in the data memory is read out during the blanking period of the next page.

19. An apparatus of claim 17, wherein the data to be shuffled are data of a video signal, and wherein a timing for inputting the data into the apparatus is synchronized with a clock which is synchronized with a horizontal synchronizing signal of the video signal, and a timing for reading out the written data from the data memory is synchronized with a clock signal of a data processor coupled to the apparatus.

20. A data shuffling apparatus for shuffling data in each of a plurality of pages of data, each of the plurality of pages being composed of a plurality of blocks of data, said apparatus comprising:

a data memory for temporarily storing data in a current page; and data address generating means coupled to the memory for generating an address of the data memory so that the data in the current page are written into the data memory in a first sequence and the written data are read out from the data memory in a second sequence which is different from the first sequence to thereby shuffle the data in the current page, wherein the data address generating means comprises:

a first address memory for recording therein addresses of the data memory for reading out the data in the current page stored in the data memory, the first address memory being responsive to an externally given read address for outputting an address recorded in an area of the first address memory indicated by the externally given read address to the data memory for reading a block of data stored in an area of the data memory indicated by the address outputted from the first address memory and then writing a block of data in a next page into the area of the data memory indicated by the address outputted from the first address memory; and a second address memory for recording therein addresses of the data memory for shuffling the data in the next page, the second address memory being responsive to an externally given write address for recording the address outputted from the first address memory into an area of the second address memory indicated by the externally given write address, and wherein operations of the first and second address memories are alternately changed over to each other on a page by page basis.

21. An apparatus of claim 20, wherein each page of the plurality of pages being inputted to the apparatus is preceded by a blanking period, and wherein the data in the current page written in the data memory is read out during the blanking period of the next page.

22. An apparatus of claim 20, wherein the data to be shuffled are data of a video signal, and wherein a timing for inputting the data into the apparatus is synchronized with a clock which is synchronized with a horizontal synchronizing signal of the video signal, and a timing for reading out the written data from the data memory is synchronized with a clock signal of a data processor coupled to the apparatus.

* * * * *